# (12) United States Patent
Marinier et al.

(10) Patent No.: US 7,764,653 B2
(45) Date of Patent: Jul. 27, 2010

(54) METHOD AND APPARATUS FOR AUTONOMOUSLY DETERMINING THE COVERAGE AREA OF AN ACCESS POINT IN A WIRELESS COMMUNICATION SYSTEM

(75) Inventors: Paul Marinier, Brossard (CA); Christopher Cave, Candiac (CA); Angelo Cuffaro, Laval (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 600 days.

(21) Appl. No.: 11/018,112

(22) Filed: Dec. 20, 2004

(65) Prior Publication Data

US 2005/0152312 A1   Jul. 14, 2005

Related U.S. Application Data

(60) Provisional application No. 60/534,854, filed on Jan. 8, 2004.

(51) Int. Cl.
*H04W 4/00* (2009.01)
(52) U.S. Cl. ............. 370/332; 370/329; 370/338; 370/445; 455/452.1; 455/522; 455/501; 709/217
(58) Field of Classification Search .......... 709/217; 455/522

See application file for complete search history.

(56) References Cited

U.S. PATENT DOCUMENTS

| | | | | |
|---|---|---|---|---|
| 5,553,316 | A * | 9/1996 | Diepstraten et al. | 370/445 |
| 5,594,731 | A * | 1/1997 | Reissner | 370/338 |
| 6,208,629 | B1 * | 3/2001 | Jaszewski et al. | 370/329 |
| 6,625,643 | B1 * | 9/2003 | Colby et al. | 709/217 |
| 2002/0168993 | A1 * | 11/2002 | Choi et al. | 455/522 |
| 2004/0137908 | A1 * | 7/2004 | Sinivaara et al. | 455/452.1 |

* cited by examiner

*Primary Examiner*—Lester Kincaid
*Assistant Examiner*—Charles Shedrick
(74) *Attorney, Agent, or Firm*—Volpe and Koenig, P.C.

(57) ABSTRACT

A method and apparatus for autonomously determining a coverage area of each of a plurality of access points (APs) in a wireless communication system are disclosed. Each of a plurality of APs transmits loud packets to, and receives loud packets from, other APs. Each AP measures received powers of the loud packets received from the other APs. Each AP estimates path losses from the other APs using the measured received powers and calculates the range of the AP from the estimated path losses from the other APs.

17 Claims, 4 Drawing Sheets

METHOD AND APPARATUS FOR AUTONOMOUSLY DETERMINING THE COVERAGE AREA OF AN ACCESS POINT IN A WIRELESS COMMUNICATION SYSTEM

CROSS REFERENCE TO RELATED APPLICATION

This application claims the benefit of U.S. provisional application 60/534,854 filed on Jan. 8, 2004, which is incorporated by reference as if fully set forth.

FIELD OF INVENTION

The present invention relates to radio resource management in a wireless communication system. More particularly, the present invention relates to a method and apparatus for autonomously setting the coverage area of access points (APs) in a wireless communication system.

BACKGROUND

A wireless communication system is supported by a set of APs deployed in a given environment. Each AP can provide wireless services to wireless transmit/receive units (WTRUs) within its coverage area. The coverage area of an AP depends on several factors, such as the transmission power of the AP and WTRUs, the sensitivities of the receivers of the AP and WTRUs, and the characteristics of the propagation environment. For the purpose of optimizing the performance of the system, it is often desirable to reduce, to a certain extent, the coverage area of each AP compared to the maximum possible area given the radio specifications (e.g. maximum transmission power) of the AP or WTRU equipment.

When it is required that a wireless communication system provide contiguous coverage within the environment where it is deployed, the minimum coverage areas of the APs are primarily dependent on the relative positioning of the set of APs supporting the system. For example, if a set of APs are located close to each other, each AP may be meant to cover a relatively small area. On the other hand, if a set of APs are located far away from each other, each AP has to cover a relatively large area in order to provide contiguous coverage.

In a wireless communication system comprising a set of APs, a number of parameters in each AP need to be configured, such as (but not limited to) the transmission power of the AP and the WTRUs served by the AP, or possibly the energy detect thresholds (EDT) used in the clear channel assessment (CCA) function of the AP and/or the WTRUs. The proper configuration of these parameters depends in general on the desired coverage area of each AP.

One possible way of configuring various parameters of an AP is to start by specifying the desired coverage area of the AP. A problem is that this approach is not very practical in realistic deployment scenarios, as it would impose that the installer of the wireless communication system manually estimate and enter the desired coverage area of each AP. This can be a tedious process, since the minimum coverage area of each AP is dependent on the relative locations of the set of APs deployed in the environment, (if contiguous coverage is a requirement). This means that every time an AP is relocated, added to, or removed from the environment, the desired coverage areas of all surrounding APs need to be re-estimated and re-entered.

The coverage area or Range, of an AP may be specified in terms of a maximum path loss. WTRUs whose path loss to an AP is equal or inferior to the Range are said to be within the coverage area of the AP. It should be noted that due to the irregular nature of the wireless environment resulting in shadowing and fading, the coverage area of an AP generally does not have a regular shape when it is specified in terms of a Range.

It would be desirable that each AP be capable of autonomously determining its desired coverage area, (defined in terms of the Range), when installed in an environment where other APs are deployed, without the need for manual configuration or reconfiguration when the particular AP or other surrounding APs are added to, relocated within, or removed from the system.

SUMMARY

A method and apparatus for autonomously determining the coverage area of each of a plurality of APs in a wireless communication system are disclosed. Each of a plurality of APs transmits loud packets to, and receives loud packets from, other APs. Each AP measures the received power of the loud packets received from the other APs. Each AP estimates path losses from the other APs using these measurements and calculates the range of the AP from the estimated path losses of the other APs.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment, a mobile station, a wireless LAN station, a fixed or mobile subscriber unit, a pager, or any other type of device capable of operating in a wireless environment. When referred to hereafter, the terminology "AP" includes but is not limited to a Node-B, a site controller, a base station or any other type of interfacing device in a wireless environment.

The features of the present invention may be incorporated into an integrated circuit (IC) or be configured in a circuit comprising a multitude of interconnecting components.

Figure 1:
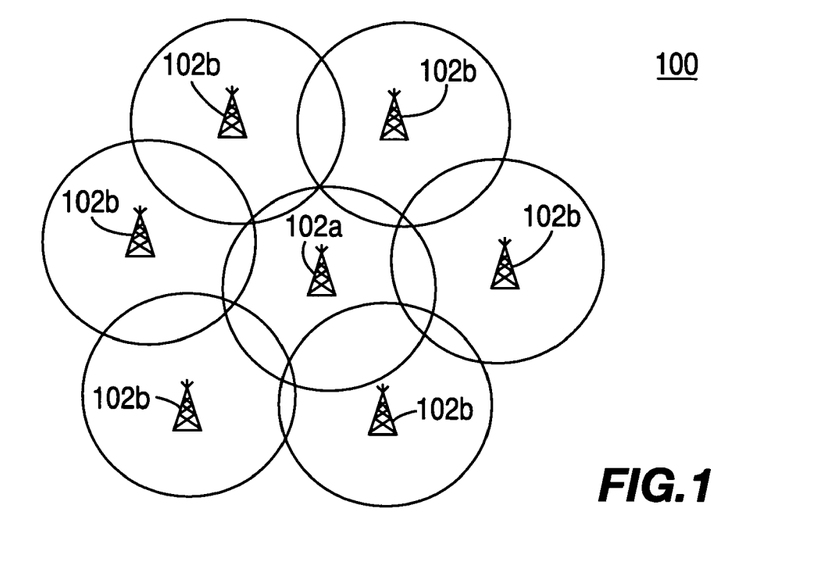
FIG. 1 is a block diagram of a wireless communication system comprising a set of APs.

FIG. 1 is a block diagram of a wireless communication system 100 comprising a plurality of APs 102. Each AP 102 estimates the path losses between itself and other APs based on measurements of received power of packets transmitted by other APs. Hereinafter, for simplicity of explanation, an AP performing this estimation will be referred to as a "listening AP", (designated as AP 102a); and other APs will be referred to hereinafter as "neighboring APs", designated as APs 102b. However, the different designations are for convenience only and those of skill in the art should realize that all of the APs 102a, 102b are the same and perform the same functions.

The measurements are performed on all received packets including packets known as "loud packets." The loud packets are identical to other packets except that they are transmitted at maximum power. A listening AP does not exclusively measure loud packets, because it cannot necessarily differentiate the loud packets from other packets. The loud packets are not directed to a specific AP at a specific time. Loud packets are transmitted intermittently and may be used by all neighboring APs.

The AP collects the received powers of all packets it can receive (loud and non-loud) during a certain period and stores in memory the power levels values of the N strongest packets $N_{srp}$. If the various parameters are set properly, statistically there is a strong probability that the $N_{srp}$ were in fact loud packets and the path loss estimation based on the assumption that these packets were transmitted at max power will be accurate. This method has the advantage that there is no need for adding a new "field" to the loud packets for the purpose of identifying them as loud packets.

In an alternative embodiment, loud packets may be identified by a special field. In this alternative, the listening AP identifies the loud packets by reading this field and only takes into account these loud packets for the purpose of path loss estimation. The power level used for transmitting a loud packet may be included in the loud packet. The listening AP would then directly estimate the path loss by subtracting the received power of the packet from the signaled transmission power.

Figure 2:
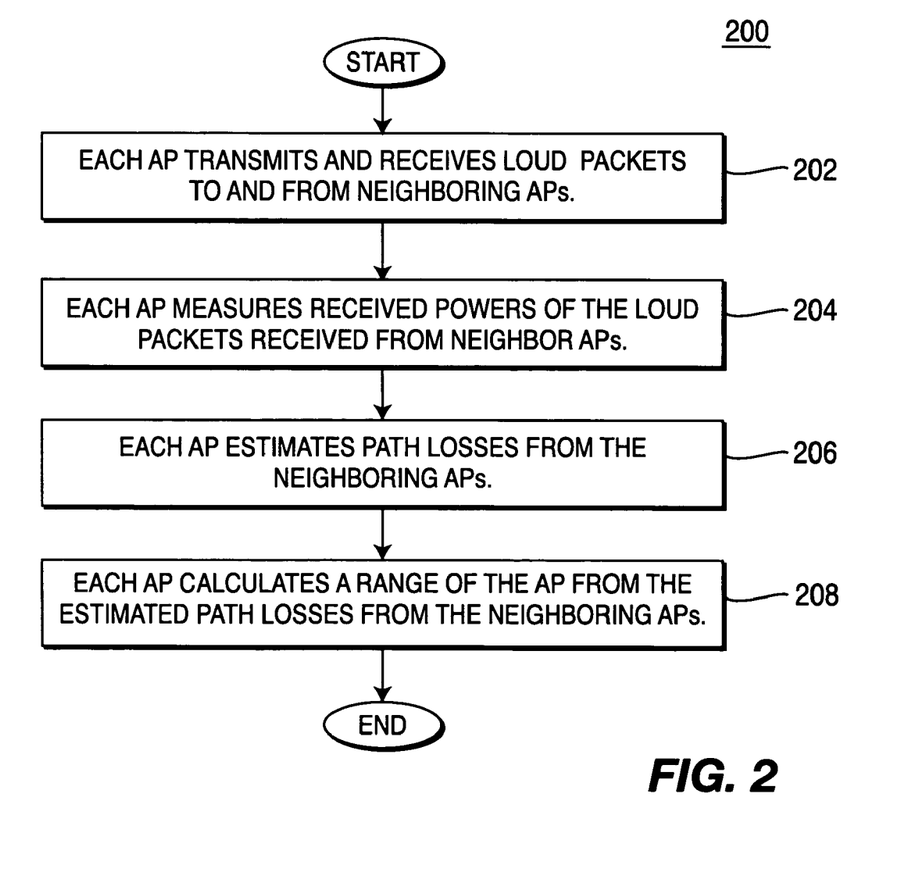
FIG. 2 is a flow diagram of a path loss discovery process for setting a Range of an AP in accordance with the present invention.

FIG. 2 is a flow diagram of a path loss discovery process 200 for setting the Range of an AP 102a in accordance with the present invention. In accordance with the path loss determination process 200, a listening AP 102a continuously estimates the path losses to neighboring APs 102b and establishes the Range of the listening AP 102a based on the path loss estimates. Each AP 102a, 102b intermittently transmits loud packets at the maximum power level in order to facilitate the estimation of path losses between the listening AP 102a and neighboring APs 102b (step 202). A listening AP 102a measures and collects the received powers of packets received from neighboring APs 102b (step 204). Path losses from the neighboring APs 102b are estimated based upon the collected received power measurements (step 206). The listening AP 102a then calculates its Range from the estimated path losses to neighboring APs 102b (step 208).

The packets received by the listening AP 102a do not, in general, contain information destined for the listening AP 102a. In other words, the packets sent by the neighboring APs 102b are not destined in general to the listening AP 102a, but rather are packets sent to all WTRUs associated with the neighboring APs 102b. In a multiple access scheme based on carrier sense multiple access/collision avoidance (CSMA/CA), it is possible for a listening AP 102a to receive packets sent by neighboring APs 102b to another node, provided that the listening AP 102a is receiving on the same channel as the one used by the neighboring APs 102b.

Figure 3:
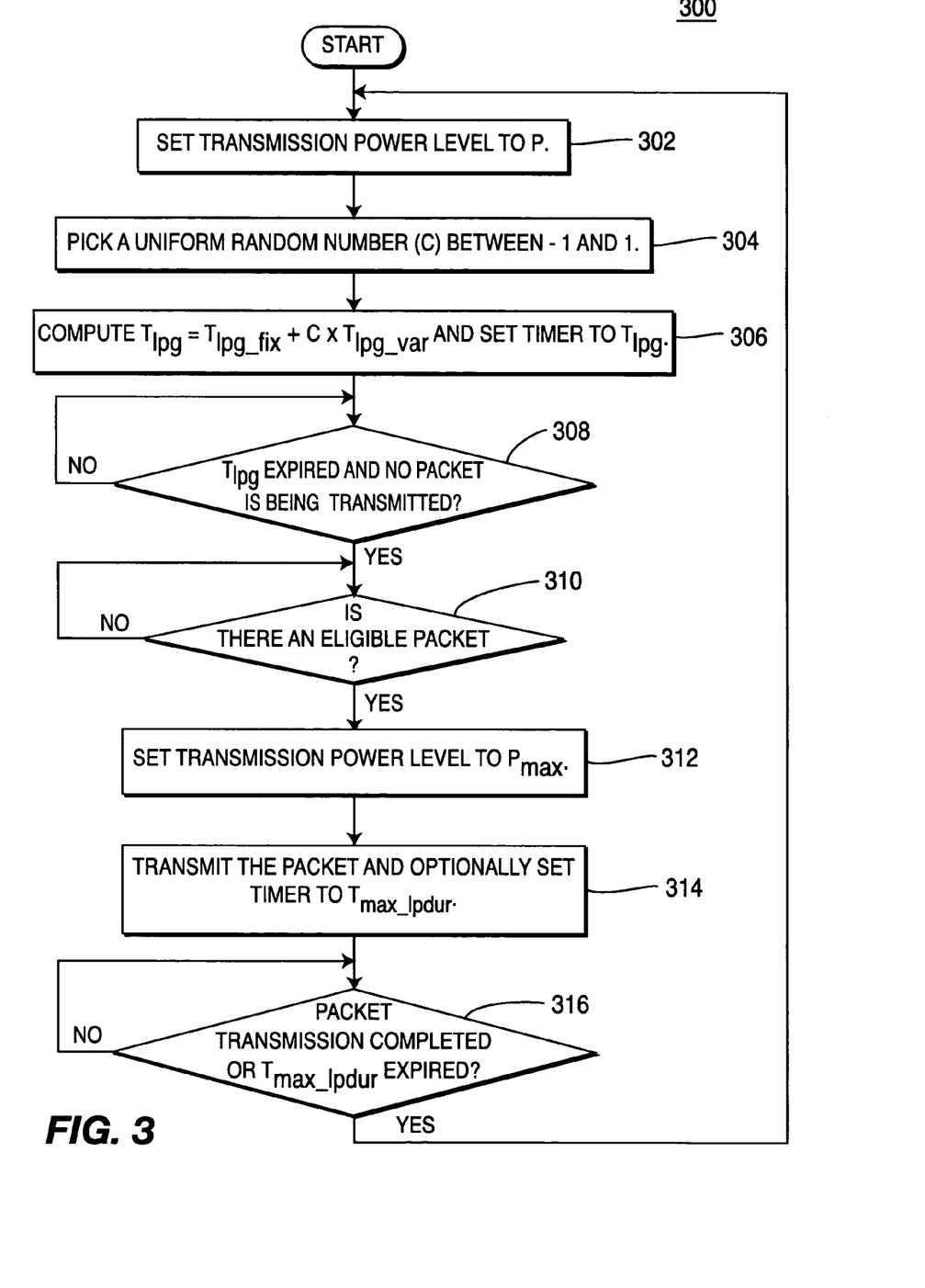
FIG. 3 is a flow diagram of a process for managing the generation of loud packets in accordance with the present invention.

FIG. 3 is a flow diagram of a process 300 for generating a loud packet in accordance with the present invention. Table 1 summarizes the parameters involved in the process 300 of generating loud packets. As those of skill in the art would realize, other parameters may be used in addition to, or in place of, these parameters.

TABLE 1

| Symbol | Description |
| --- | --- |
| $T_{lpg\_fix}$ | Fixed component of the loud packet generation interval |
| $T_{lpd\_var}$ | Amplitude of the variable component of the loud packet generation interval |
| $T_{max\_lpdur}$ | Maximum duration of a loud packet |
| $P_{max}$ | Maximum transmission power |
| P | Transmission power used by packets other than loud packets. |

Loud packets are packets which are transmitted at maximum power. Loud packets are generated by intermittently raising the transmission power to the maximum power $P_{max}$ prior to the transmission of the packets. Any packet that would normally be transmitted by an AP to one of its associated WTRUs may become a loud packet, provided that it is possible to identify the transmitting AP, such as by determining the source address, from the information contained in the packet. Such a packet is referred to hereinafter as an "eligible packet". As explained hereinbefore, the information in a loud packet does not need to be destined to the listening AP 102a receiving and utilizing them for the purpose of path loss estimation.

The AP sets a transmission power level to P (step 302). Generally, the AP transmits packets other than loud packets at a certain power P, which may be lower than the maximum power $P_{max}$. This power level might be dependent on the type of packet being transmitted, (such as control, management or data frame), or on the destination of a WTRU. The AP then picks a random number (C) between −1 and 1 to compute a transmission time interval of loud packets (step 304). A minimum interval of time ($T_{lpg}$) between successive periods of loud packet generation is computed according to Equation 1 (step 306):

$$T_{lpg} = T_{lpg\_fix} + C \times T_{lpg\_var};  \quad \text{Equation (1)}$$

where C is the variable between −1 and 1. The AP does not send a loud packet before this interval of time $T_{lpg}$ expires. Randomness in the $T_{lpg}$ in Equation 1, which is obtained from a variability of the value C, is for the purpose of reducing the probability of simultaneous generation of loud packets between APs. However, a packet will not always be transmitted just after the expiration of the $T_{lpg}$ timer, since an AP may not always have a packet to transmit when the timer expires.

The AP waits until $T_{lpg}$ expires and verifies that no packet is being transmitted (step 308). If a packet is being transmitted, the process 300 returns to step 308 and the AP keeps waiting until the end of transmission of the packet. If $T_{lpg}$ expires and no packet is being transmitted, the AP determines whether there is an eligible packet to be transmitted (step 310). If there is no eligible packet, the process 300 returns to step 310 to wait until there is an eligible packet. If there is an eligible packet, the AP sets its transmission power to the maximum level (step 312) and transmits the packet (step 314).

The AP may optionally set a timer for the maximum duration of a loud packet $T_{max\_lpdur}$ (step 314). The AP determines whether either a transmission of the packet is completed or $T_{max\_lpdur}$ expires (step 316). If either of them occurs, the process 300 returns to step 302. If $T_{max\_lpdur}$ expires before transmission of the loud packet is completed, the AP may restore its transmission power to a value lower than the maximum in order to limit interference.

Figure 4:
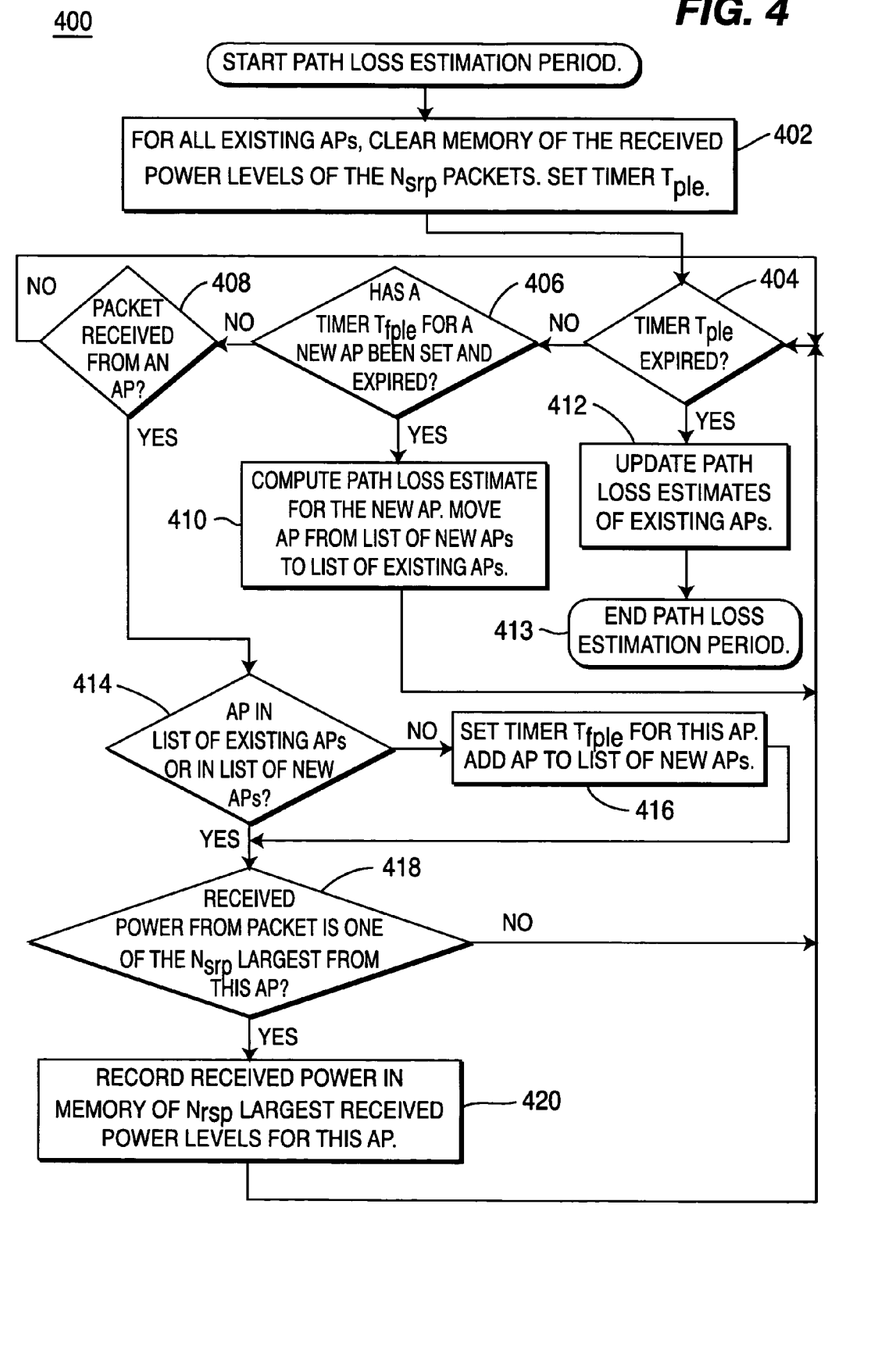
FIG. 4 is a flow diagram of a process for detecting path losses during one path loss detection period in accordance with the present invention.

FIG. 4 is a flow diagram of a process 400 for estimating path losses to neighboring APs in accordance with the present invention. This process 400 is repeated every path loss estimation period ($T_{ple}$). The listening AP maintains at all times, two lists of neighboring APs: 1) a list of existing neighboring APs; and 2) a list of new neighboring APs. For each neighboring AP in either list, the listening AP maintains in memory the power level values of $N_{srp}$ packets transmitted from neighboring APs. Alternatively, the listening AP may also maintain in memory more information about the received power of packets transmitted from neighboring APs, such as a histogram of the number of received packets for different intervals of received power.

Table 2 summarizes the parameters that are involved in path loss estimation. As those of skill in the art would realize, other parameters may be used, in addition to, or in place of these parameters.

TABLE 2

| Symbol | Description |
| --- | --- |
| $T_{ple}$ | Duration of a path loss estimation period |
| $T_{fple}$ | Duration of the path loss estimation period of a new AP |
| $N_{srp}$ | Number of power level values of the strongest packets to keep in memory |
| $N_{dap}$ | Number of path loss detection period(s) after which an AP is removed from the list if no packet is received from it. |
| $N_{aplp}$ | Averaging window of path loss estimates |
| PL(i) | Path loss to the AP #i |

The path loss estimation process 400 starts by clearing the memory of the power levels values of the $N_{srp}$ packets, (or any information regarding the received power of packets), for all APs in the list of existing neighboring APs (step 402). The AP also sets a timer of duration $T_{ple}$ for the expiration of the path loss estimation period (step 402).

The AP determines whether the timer $T_{ple}$ has expired (step 404). If it is determined that the timer ($T_{ple}$) for the path loss estimation period has expired, the listening AP computes path loss estimates to all neighboring APs in the list of existing APs according to the process 500 which will be explained with reference to FIG. 5 hereinafter (step 412). The path loss estimation process 400 is then completed (step 413).

If the timer $T_{ple}$ has not expired, the AP further determines whether a timer for new AP, $T_{fple}$, (which is set when a new AP is discovered at steps 414 and 416, which will be explained hereinafter), has expired (step 406). If there is no new AP in the list of new neighboring APs, (and therefore $T_{fple}$ has not been set and expired), the AP determines whether a packet is received from an AP (step 408). If it is determined at step 408 that there is no packet received from an AP, the process 400 returns to step 404.

If there is a packet received from an AP, the listening AP determines whether the transmitting AP is present in one of the two lists of neighboring APs that the listening AP maintains (step 414). If the transmitting AP is not present on the lists of neighboring APs, the transmitting AP is added to the list of new neighboring APs (step 416). Additionally, a timer for a new AP, $T_{fple}$, is set for this new AP. The duration of $T_{fple}$ is normally set to be smaller than the duration of $T_{ple}$ of the path loss estimation period. This allows the listening AP to update its Range more quickly in case a new AP is powered on in its vicinity, although this is not required. At the expiration of $T_{fple}$, a path loss estimate to this new AP will be calculated in step 410. After step 416, the process 400 then proceeds to step 418.

If the transmitting AP is present on the list, (or after the new AP is added to the list of neighboring APs), the process 400 proceeds to step 418 to determine if the received power value of the packet is one of the $N_{srp}$ largest received power values of packets sent by the transmitting AP since the beginning of the path loss estimation period. If this is the case, the memory of AP is updated to include this new information, (i.e. regarding the newest $N_{srp}$ packet) (step 420). The process 400 returns to step 404. If this is not the case the process 400 returns directly to step 404.

Referring back to step 406, if it is determined that the timer ($T_{fple}$) for a new AP has expired (step 406), the listening AP computes the path loss estimate to the new AP according to the process 500 which will be described with reference to FIG. 5 hereinafter. The listening AP also moves the new AP from the list of new neighboring APs to the list of existing neighboring APs (step 410).

Additionally, (and optionally), if there is a neighboring AP in the list of existing APs from which no packet was received since $N_{dap}$ activations of the path loss estimation process 400, this AP is removed from the list of existing APs. This is performed at step 412 just prior to the path loss estimates of existing APs being updated. This allows the listening AP to automatically reconfigure its coverage area in case an AP is shut down or removed from the environment.

Figure 5:
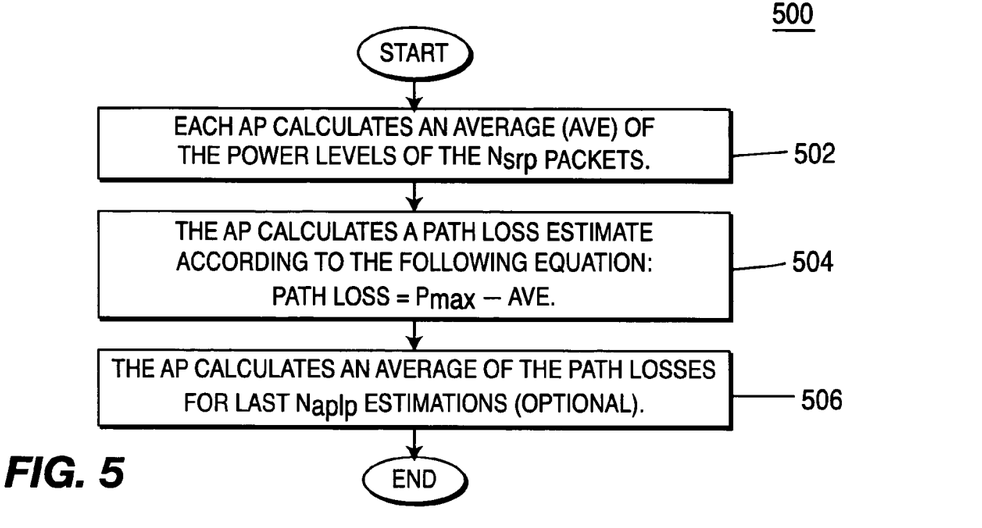
FIG. 5 is a flow diagram of a process for estimating path loss in accordance with the present invention.

FIG. 5 is a flow diagram of a process 500 for calculating a path loss estimate to an AP which is implemented in steps 410 and 412 in the process 400. The average (AVE) of the power levels of the $N_{srp}$ packets sent by the concerned AP, collected in the process 400, is calculated (step 502). The calculation of AVE is performed on these values in order to reduce the variations due to temporal fading. If less than $N_{srp}$ packets have been collected, AVE is taken only over the number of collected values. Preferably, AVE should be calculated on values of received power expressed in linear units (e.g. mW, or W). Then AVE may be converted in dBm units. Alternatively, AVE could take place on the values of received power expressed in dB units (e.g., dBm or dBW).

After calculating AVE, a path loss estimate in dB for the latest estimation period is calculated using the following Equation 2 (step 504).

$$\text{Path loss} = P_{max} - \text{AVE}; \quad \text{Equation (2)}$$

where $P_{max}$ is the maximum transmission power of the loud packets, and AVE is the average on received powers, both expressed in dBm.

The value for $P_{max}$ may be obtained in many possible ways. For example, the value could be signaled between APs implementing the invention, along with the loud packets themselves or in separate messages. Preferably, the APs implementing the invention can be configured to use a certain value of $P_{max}$, consistent with a typical maximum power level of commercially available APs (e.g. 20 dBm). A listening AP implementing the present invention assumes that neighboring APs use this value of $P_{max}$. This would allow an AP implementing the invention to calculate with a reasonable accuracy a path loss estimate to a neighboring AP not implementing the invention (i.e., a legacy AP) but transmitting most or all of its packets at power level close to $P_{max}$.

The path loss estimate calculation in Equation (2) uses the fact that there is a strong probability that the power level values of the $N_{srp}$ packets from a neighboring AP were collected from packets transmitted at, or close to, the maximum power $P_{max}$ from this AP. The process of transmission of loud packets by the neighboring AP ensures that at least a fraction of the packets transmitted by this AP are transmitted at the maximum power $P_{max}$. It should be understood by those of skill in the art that the path loss can be calculated in other ways. For example, a path loss estimate in linear units can be calculated by dividing the transmission power of the loud packet expressed in linear units by the average received power expressed in linear units.

The path loss estimate to a neighboring AP calculated for a path loss estimation period may be averaged with path loss estimates to the same AP calculated in the past ($N_{aplp}$−1) path loss estimation periods (step 506) in order to improve the accuracy and stability of the path loss estimation.

FIG. 5 and the associated description set forth a general process 500 for an AP to estimate its path loss to other APs, as well as helping other APs to estimate their path losses to this AP by sending loud packets. These methods can be made more efficiently by implementing a number of optional techniques that will be described hereinafter.

In a first optional technique, in order to accelerate the discovery of a newly activated AP by neighboring APs just after its activation, the newly activated AP may transmit loud packets continuously or at a higher frequency than normal for a limited period of time.

In a second optional technique, a listening AP receiving a large number of loud packets from an AP during a path loss estimation period may underestimate the average path loss to the new AP due to the temporal fading fluctuations between the APs and the method of estimation based on selecting the largest received power values. This can be mitigated by restricting the use of packets received from other APs to certain time windows only. For example, the listening AP may consider packets from other APs for path loss estimation only during windows of 5 ms occurring intermittently approximately every 1,500 ms. This would have the effect of reducing the number of received loud packets used in the path loss estimation and consequently the bias toward high values of the received power.

In a third optional technique, a listening AP may estimate its path losses to other APs utilizing channels different from the operating channel of the listening AP by tuning its receiver to the different channels for short periods of time occurring intermittently. These periods could last for example 5 ms and occur every 1,500 ms for a given channel. This technique also allows the listening AP to gather information about channels used by neighboring APs which can be useful for the purpose of optimizing channel selection.

Figure 6:
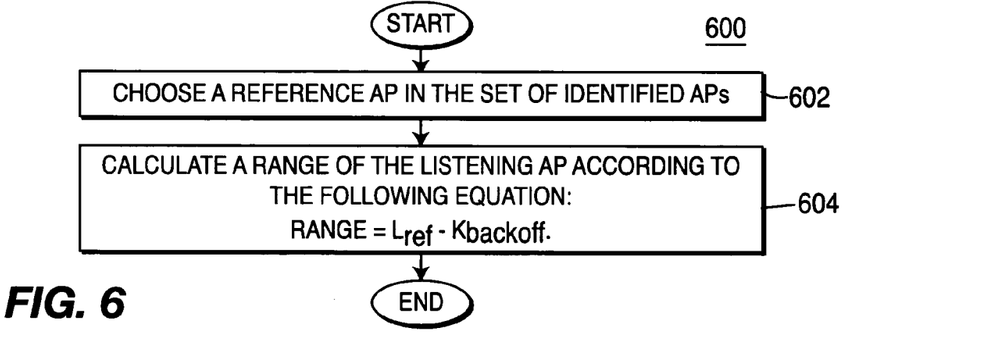
FIG. 6 is a flow diagram of a process of calculating a Range of the listening AP from the estimates of path losses in accordance with the present invention.

FIG. 6 is a process 600 for calculating the Range of an AP from the estimates of path losses to other APs. It should be understood by those of skill in the art that various methods of calculating a Range other than the one disclosed in the present invention can be implemented in accordance with the present invention.

Table 3 summarizes the parameters involved in the calculation of Range of the AP. As those of skill in the art would realize, other parameters may be used in addition to, or in place of, these parameters.

TABLE 3

| Symbol | Description |
| --- | --- |
| PL(i) | Set of path losses to the AP #i (from the measurement sub-process) |
| $N_{cpcn}$ | Parameter to choose the reference AP |
| $K_{backoff}$ | Backoff from the reference AP |

Referring to FIG. 6, a reference AP is selected among a set of identified APs (step 602). The identified APs are generally neighboring APs, although this is not a requirement. A listening AP defines its coverage area based on its path loss to the reference AP. The reference AP may be selected as the AP to which the path loss is the $N_{cpcn}^{th}$ smallest. In the case where the number of identified APs detected by the listening AP is smaller than the constant $N_{cpcn}$, it is deemed that there is no reference AP. In this situation, the desired Range (coverage area) of the listening AP is defined to be "unlimited". This means that the listening AP should, for example, transmit at its maximum power.

After the reference AP has been selected, the Range is established by defining a certain amount of overlap between the coverage areas of the reference AP and of the listening AP (step 604). The Range of the AP in dB is calculated according to the following Equation:

$$RANGE = L_{ref} - K_{backoff};$$ Equation (3)

where $L_{ref}$ is the path loss to the reference AP, and $K_{backoff}$ is a constant representing the difference between the path loss to the reference AP and the path loss of a WTRU situated at the edge of the coverage area of the listening AP.

Selecting a lower value for $N_{cpcn}$ for a given value of $K_{backoff}$ tends to reduce the coverage area of the listening AP, (and the overlap between the coverage areas of this AP to neighboring APs), since the path loss to the reference AP is smaller. Conversely, a higher value for $N_{cpcn}$ tends to increase the coverage area of the listening AP. For a given value of $N_{cpcn}$, selecting a smaller value for $K_{backoff}$ tends to increase the coverage area of the listening AP, as well as the overlap between the coverage areas of the listening AP and that of the reference AP. Selecting a larger value has the opposite effect.

In general, a large overlap between coverage areas of APs is beneficial for avoiding coverage gaps, but may be detrimental when it is desired to reduce the interactions between APs. It should also be noted that the choice of values for these parameters should be dependent on whether or not neighboring APs operating on different channels were detected, (by intermittently listening on these other channels as previously explained in the paragraphs on optional techniques). If neighboring APs operating on different channels were not detected, then $N_{cpcn}$ could be set to a smaller value since there is a possibility that other neighboring APs operating on different channels are present and closer than the closest detected co-channel AP.

Figure 7:
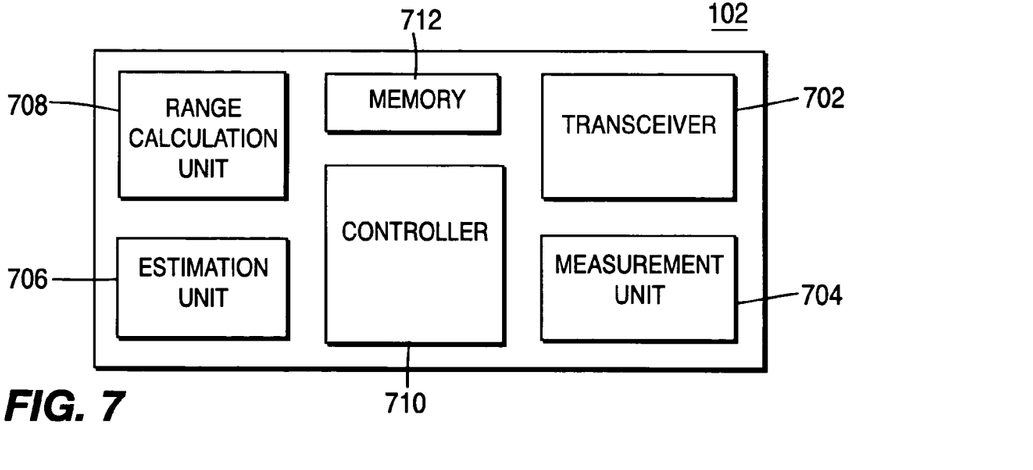
FIG. 7 is a block diagram of an AP configured to autonomously determine the coverage in accordance with the present invention.

FIG. 7 is a block diagram of an AP configured to autonomously determine the coverage in accordance with the present invention. The AP 102 comprises a transceiver 702, a measurement unit 704, an estimation unit 706, a range calculation unit 708, a controller 710, a memory 712 and a communication bus (not shown) to interconnect the units 702-710. The transceiver 702 generates loud packets, transmits loud packets to, and receives loud packets from, other APs. Loud packets are transmitted at the maximum power level of the AP 102. As aforementioned, the maximum level may be a predetermined value, or a special field may be inserted into the loud packet to indicate the transmission power level of the loud packets. The measurement unit 704 measures received powers of the loud packets received from the other APs. The estimation unit 706 estimates path losses from other APs using the measured received powers and a known transmission power level of the loud packets. The range calculation unit 708 calculates the range of the AP from the estimated path losses from other APs.

The memory 712 stores a list of other APs. Although, the list actually comprises two sub-lists, (a sub-list of existing APs and a sub-list of new APs), functionally, a single list with a sub-designation is all that is required. When the AP receives a loud packet from a particular AP, the controller 710 determines whether the particular AP is included in the list, and adds the AP to the list in memory 712 if the AP is not included in the list. The controller 710 also controls the duration for measuring the received power of the packets before a path loss estimate is calculated. The controller 710 sets the duration for new APs differently from, and preferably shorter than, existing APs.

Although the features and elements of the present invention are described in the preferred embodiments in particular combinations, each feature or element can be used alone, (without the other features and elements of the preferred embodiments), or in various combinations with or without other features and elements of the present invention.

What is claimed is:

1. A method implemented by a listening AP operating in a plurality of access points (APs) for autonomously determining its respective coverage, the method comprising:
   receiving packets from other APs, wherein at least one of the received packets is a loud packet, wherein the loud packet is an eligible data packet transmitted at the maximum power level attainable by a transmitting AP at a configurable random time interval;
   determining whether a path loss estimation timer is expired;
   on a condition that the timer has not expired, for each received packet:
       determining whether the transmitting AP is in a list of existing AP's known to the listening AP;
       adding the transmitting AP to a list of new APs known to the listening AP on a condition that the transmitting AP is not in a list of existing APs known to the listening AP;
       measuring the received power of the packet;
       comparing the received power of the packet to a largest N measured received powers for the transmitting AP, wherein N is less than a total number of packets received;
       recording the received power of the packet in the largest N measured received powers on a condition that the received power of the packet is in the largest N measured received powers of the transmitting AP;
   on a condition that the timer has expired, for each existing and new AP known to the listening AP;
       averaging the N measured received powers for the existing or new AP;
       subtracting the result of the averaging from the maximum transmit power of the existing or new AP;
       updating a path loss estimate for the existing or new AP; and
       calculating a range of the listening AP from the path loss estimates.

2. The method of claim 1 wherein each of the plurality of APs has a different transmission time window for transmitting a loud packet.

3. The method of claim 1 wherein the loud packet includes a special field indicating that the packet is a loud packet.

4. The method of claim 1 wherein the AP exchanges messages indicating the transmission power level used for transmission of the loud packet.

5. The method of claim 1 further comprising deleting an existing AP on a condition that no packet is received from the AP for a predetermined period of time.

6. The method of claim 1 wherein a duration for measuring the received power of the packets are set differently for a new AP that is not included in the list of other APs.

7. The method of claim 1 further comprising selecting a reference AP, whereby the range is calculated based on path loss to the reference AP and a parameter defining a degree of overlapping of coverage area with the reference AP.

8. The method of claim 7 wherein the reference AP is selected as an AP to which the path loss is an $N^{th}$ smallest.

9. A listening access point (AP) operating in a plurality of APs for autonomously determining its coverage area, comprising:
   a transceiver configured to receive packets from transmitting APs, wherein at least one transmitted packet is a loud packet transmitted at the maximum power level attainable by the transmitting AP at a configurable random time interval;
   a measurement unit configured to measure a power of each packet received from a transmitting AP;
   a controller configured to:
       set a path loss estimation timer;
       determine whether the timer is expired in response to the transceiver receives a packet;
       on a condition that the timer is not expired, for each received packet:
           identify the transmitting AP that sent the packet;
           determining whether the transmitting AP is in a list of existing AP's known to the listening AP;
           adding the transmitting AP to a list of new APs known to the listening AP on a condition that the transmitting AP is not in a list of existing APs known to the listening AP;
           compare the received power of the packet to a largest N measured receive powers for the transmitting AP, wherein the largest N measured receive powers is less than a total number of packets received;
           record the received power of the packet in the largest N measured receive powers on a condition that the received power of the packet is in the largest N measured receive powers of the transmitting AP;
       on a condition that the timer is expired, for each existing and new AP known to the listening AP:
           signaling an estimation unit for estimating path loss for the existing or new AP;
           the estimation unit configured to:
               average the largest N measured receive powers for each existing and new AP known to the listening AP;
               subtract the resulting average from the maximum transmit power of the existing or new AP;
               estimate a path loss for the existing or new AP; and
   a range calculation unit for calculating the range of the listening AP from the estimated path loss from all existing and new APs known to the listening AP.

10. The AP of claim 9 wherein each transmitting AP has a different transmission time window for transmitting a loud packet than another transmitting AP.

11. The AP of claim 9 wherein each packet includes a special field indicating whether the packet is a loud packet.

12. The AP of claim 9 wherein the AP exchanges messages indicating the transmission power level used for transmission of a loud packet.

13. The AP of claim 9 wherein a duration for measuring the received power of the packets before calculating a path loss estimate is set differently for a new AP that is not included in the list of other APs.

14. The AP of claim 9 wherein the controller deletes an existing AP on a condition that no packet is received from the AP for a predetermined period of time.

15. The AP of claim 9 wherein the range calculation unit selects a reference AP, and calculates the range based on a path loss to the reference AP and a parameter defining a degree of overlapping of coverage area with the reference AP.

16. The AP of claim 15 wherein the reference AP is selected as an AP to which the path loss is an $N^{th}$ smallest.

17. An integrated circuit (IC) included within an Access Point (AP) for autonomously determining a coverage area of the AP among a plurality of APs, the IC comprising:
- a transceiver for receiving packets from a plurality of transmitting APs wherein at least one transmitted packet is a loud packet transmitted at the maximum power level attainable by a transmitting AP at a configurable random time interval;
- an identification unit for identifying each transmitted loud packet;
- a measurement unit for measuring a power of each packet received from a transmitting AP;
- a controller configured to:
  - set a path loss estimation timer;
  - determine whether the timer is expired in response to the transceiver receiving a packet;
  - on a condition that the timer is not expired, for each received packet;
    - identify the transmitting AP that sent the packet;
    - determining whether the transmitting AP is in a list of existing AP's known to the listening AP;
    - adding the transmitting AP to a list of new APs known to the listening AP on a condition that the transmitting AP is not in a list of existing APs known to the listening AP;
    - compare the received power of the packet to a largest N measured receive powers for the transmitting AP, wherein N is less than a total number of packets received;
    - record the received power of the packet in the largest N measured receive powers on a condition that the received power of the packet is in the largest N measured receive powers of the transmitting AP;
  - on a condition that that timer is expired, for each existing and new AP known to the listening AP:
    - signaling an estimation unit for estimating path loss for the existing or new AP;
- the estimation unit configured to:
  - average the largest N measured receive powers for each existing and new AP known to the listening AP;
  - subtract the resulting average from a maximum transmit power of the existing or new AP;
  - estimate a path loss for the existing or new AP; and
- a range calculation unit for calculating the range of the AP from the estimated path loss from all existing and new APs known to the AP.

* * * * *